United States Patent
Goto et al.

(10) Patent No.: US 11,262,449 B2
(45) Date of Patent: Mar. 1, 2022

(54) SIGNAL PROCESSING DEVICE AND RADAR DEVICE

(71) Applicant: FURUNO ELECTRIC CO., LTD., Hyogo (JP)

(72) Inventors: Keisuke Goto, Ikoma (JP); Hitoshi Maeno, Nishinomiya (JP)

(73) Assignee: FURUNO ELECTRIC CO., LTD., Hyogo (JP)

( * ) Notice: Subject to any disclaimer, the term of this patent is extended or adjusted under 35 U.S.C. 154(b) by 316 days.

(21) Appl. No.: 16/304,308

(22) PCT Filed: May 18, 2017

(86) PCT No.: PCT/JP2017/018643
§ 371 (c)(1),
(2) Date: Nov. 26, 2018

(87) PCT Pub. No.: WO2017/204075
PCT Pub. Date: Nov. 30, 2017

(65) Prior Publication Data
US 2019/0137624 A1    May 9, 2019

(30) Foreign Application Priority Data
May 26, 2016    (JP) .............................. JP2016-104968

(51) Int. Cl.
*G01S 13/937* (2020.01)
*G01S 7/12* (2006.01)
(Continued)

(52) U.S. Cl.
CPC .............. *G01S 13/937* (2020.01); *G01S 7/12* (2013.01); *G01S 7/41* (2013.01); *G08G 3/02* (2013.01); *G01S 13/66* (2013.01)

(58) Field of Classification Search
CPC .......... G08G 3/02; G08G 3/00; G08G 5/0013; G08G 5/0026; G08G 5/0082; G08G 1/16;
(Continued)

(56) References Cited

U.S. PATENT DOCUMENTS 3,717,873 A * 2/1973 Riggs .................... G01S 13/937
342/41
2009/0079590 A1* 3/2009 Hiraoka ................... B63J 99/00
340/984

(Continued)

FOREIGN PATENT DOCUMENTS

| JP | H11125675 | 5/1999 |
| JP | 2005339175 | 12/2005 |
| JP | 2014174039 | 9/2014 |

OTHER PUBLICATIONS

"International Search Report (Form PCT/ISA/210)" of PCT/JP2017/018643, dated Aug. 1, 2017, with English translation thereof, pp. 1-2.

*Primary Examiner* — Olumide Ajibade Akonai
(74) *Attorney, Agent, or Firm* — JCIPRNET

(57) ABSTRACT

To accurately calculate a location range which a ship is capable of reaching within a prescribed time interval. A signal processing device is configured so as to be equipped with reachable range calculation units 17, 18 which calculate a reachable range, which is the location range a ship is capable of reaching within a prescribed time interval, on the basis of the static information of the ship.

9 Claims, 7 Drawing Sheets

(51) Int. Cl.
*G01S 7/41* (2006.01)
*G08G 3/02* (2006.01)
*G01S 13/66* (2006.01)

(58) Field of Classification Search
CPC ........ G08G 9/02; B63B 49/00; G01C 21/203; G01S 13/917; G01S 13/937; G01S 19/13; G01S 15/93; G01S 17/93; G01S 7/51; G01S 7/12; G01S 7/41; G01S 13/66
See application file for complete search history.

(56) References Cited

U.S. PATENT DOCUMENTS

| | | | |
|---|---|---|---|
| 2014/0142845 A1* | 5/2014 | Fueller | G01C 21/20 701/461 |
| 2014/0306997 A1 | 10/2014 | Kubota et al. | |
| 2015/0134559 A1* | 5/2015 | Murray | G06Q 10/0833 705/333 |
| 2016/0069987 A1* | 3/2016 | Ise | G01S 13/86 342/179 |
| 2016/0217692 A1* | 7/2016 | Lee | G08G 3/02 |
| 2016/0363671 A1* | 12/2016 | Anderson | G01C 21/203 |
| 2017/0287340 A1* | 10/2017 | Suzuki | G08G 3/02 |

* cited by examiner

SIGNAL PROCESSING DEVICE AND RADAR DEVICE

CROSS-REFERENCE TO RELATED APPLICATION

This application is a 371 application of the International PCT application serial no. PCT/JP2017/018643, filed on May 18, 2017, which claims the priority benefits of Japan Patent Application No. 2016-104968, filed on May 26, 2016. The entirety of each of the above-mentioned patent applications is hereby incorporated by reference herein and made a part of this specification.

TECHNICAL FIELD

The present invention relates to a signal processing device which predicts a location of a ship and a radar device equipped with the signal processing device.

BACKGROUND ART

A conventional technology of calculating a predicted location of a ship after a prescribed clock time is known. According to a moving body display device disclosed in Patent Literature 1, for example, tip ends of an AIS symbol 63 and a TT symbol 64 displayed on a screen represent the location of the ship after a reference time.

CITATION LIST

Patent Literature

[Patent Literature 1]
Japanese Patent Application Laid-Open (JP-A) No. 2014-174039

SUMMARY OF INVENTION

Technical Problem

Incidentally, the aforementioned location of the ship after the reference time is predicted under a condition that a speed and a traveling direction of the ship are constant. Therefore, an actual location of the ship deviates from the predicted location in a case in which the speed or the traveling direction of the ship changes, for example. That is, it is not possible to recognize which range the predicted location of the ship falls in with this conventional device.

The present invention is intended to solve the aforementioned problems, and an object thereof is to accurately calculate a location range that a ship can reach within a prescribed time interval.

Solution to Problem (1) In order to solve the aforementioned problems, a signal processing device according to an aspect of the present invention includes: a reachable range calculation unit which calculates a reachable range, which is the location range a ship is capable of reaching within a prescribed time interval, on the basis of the static information of the ship. Note that the static information of the ship is characteristics that the ship has and does not change with time in the specification. Specifically, the size, the type, and the like of the ship are exemplified. Note that the static information of the ship does not include characteristics that change with time. For example, the location, the speed, the bow direction, the turning angular velocity, and the like are not included in the static information of the ship.

(2) The signal processing device further includes: a static information estimation unit which estimates the static information of the ship on the basis of reflected waves, which are transmitted waves reflected by and returned from the ship.

(3) The static information estimation unit estimates the size of the ship for the static information of the ship on the basis of the reflected waves reflected by and returning from the ship.

(4) The static information of the ship is information obtained through an AIS antenna.

(5) The static information of the ship is information input by a user.

(6) The signal processing device further includes: a maximum veering angle calculation unit which calculates a maximum veering angle of the ship on the basis of the static information of the ship, and the reachable range calculation unit calculates the reachable range on the basis of the maximum veering angle.

(7) The static information of the ship is information related to at least either the size of the ship or the type of the ship.

(8) The reachable range calculation unit further calculates the reachable range on the basis of dynamic information of the ship.

(9) The reachable range calculation unit calculates the respective reachable ranges of the plurality of ships, and the signal processing device further includes a collision risk range deciding unit which decides a part in which the respective reachable ranges of the at least two ships overlap each other as a collision risk range.

(10) In order to solve the aforementioned problems, a radar device according to an aspect of the present invention includes: the signal processing device according to any of the above; and a display on which a reachable range calculated by the signal processing device is displayed.

Advantageous Effects of Invention

According to the present invention, it is possible to accurately calculate a location range that a ship can reach within a prescribed time interval.

DESCRIPTION OF PREFERRED EMBODIMENTS

Hereinafter, an embodiment of a radar device 1 that has a signal processing unit 10 that serves as the signal processing device according to the present invention will be described with reference to drawings.

Figure 1:
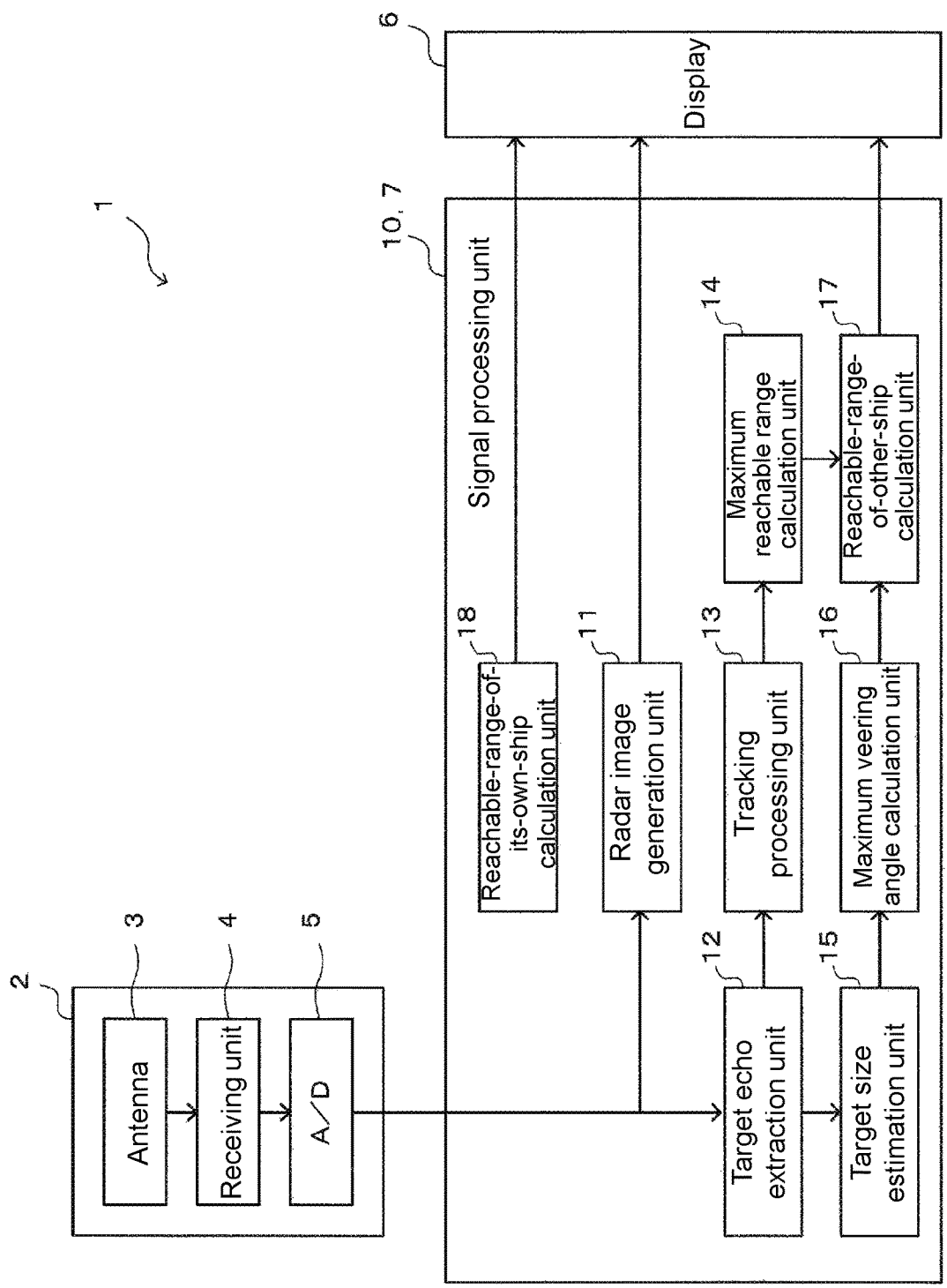
FIG. 1 is a block diagram of a radar device according to an embodiment of the present invention.

FIG. 1 is a block diagram of the radar device 1 according to the embodiment of the present invention. The radar device 1 according to the embodiment is a radar for a ship, for example, and is used for searching for object targets, mainly other ships. In addition, the radar device 1 is configured to be able to track a ship selected as an object target to be tracked. Note that a ship equipped with the radar device 1 is referred to as "the host ship".

As illustrated in FIG. 1, the radar device 1 includes an antenna unit 2, the signal processing unit 10, and a display 6.

The antenna unit 2 includes an antenna 3, a receiving unit 4, and an A/D conversion unit 5.

The antenna 3 is a radar antenna capable of sending pulse-form electric waves (transmitted waves) with high directivity. Also, the antenna 3 is configured to receive reflected waves from an object target. The radar device 1 measures a time from transmission of the pulse-form electric waves until reception of the reflected waves. In this manner, the radar device 1 can detect the distance to the object target. The antenna 3 is configured to be rotatable by 360° on a level surface. The antenna 3 is configured to transmit and receive electric waves at respective times while changing a wave transmitting direction of the pulse-form electric waves (specifically, while changing an antenna angle). With the aforementioned configuration, the radar device 1 can search for an object target in a plane in the surroundings of the host ship over 360°.

Note that an operation after transmission of the pulse-form electric waves until the next transmission of the pulse-form electric waves will be referred to as "sweeping" in the following description. Also, an operation of causing the antenna to rotate by 360° while transmitting and receiving electric waves will be referred to as "scanning".

The receiving unit 4 detects and amplifies an echo signal obtained from the reflected waves received by the antenna 3. The receiving unit 4 outputs the amplified echo signal to the A/D conversion unit 5. The A/D conversion unit 5 samples the echo signal in an analog format and converts the signal into digital data of a plurality of bits. The digital data is echo data. The echo data includes data that specifies an intensity of the echo signal obtained from the reflected waves received by the antenna 3. The A/D conversion unit 5 outputs the echo data to the signal processing unit 10.

(Configuration of Signal Processing Unit)

The signal processing unit 10 has a radar image generation unit 11, a target echo extraction unit 12, a tracking processing unit 13, a maximum reachable distance calculation unit 14, a target size estimation unit 15 (static information estimation unit), a maximum veering angle calculation unit 16, an other ship reachable range calculation unit 17, and a host ship reachable range calculation unit 18.

The signal processing unit 10 is formed of devices such as a hardware processor 7 (for example, a CPU, an FPGA, or the like) and a nonvolatile memory. It is possible to cause the signal processing unit 10 to function as the radar image generation unit 11, the target echo extraction unit 12, the tracking processing unit 13, and the like by the CPU reading and executing programs from the nonvolatile memory, for example.

The radar image generation unit 11 generates a radar image of 360° around the location of the host ship in the horizontal direction on the basis of the echo data output from the A/D conversion unit 5.

The target echo extraction unit 12 extracts an echo image attributable to a target (specifically, a ship). Specifically, the target echo extraction unit 12 groups sample points, which are distant from each other by distances that are less than a predetermined distance, from among sample points with an echo intensity that is equal to or greater than a predetermined threshold value as echoes from the same target in one example. Then, the target echo extraction unit 12 detects an echo image formed of the plurality of grouped sample points as an echo image from the same target.

The tracking processing unit 13 is configured to perform tracking processing of tracking the echo image of the target extracted by the target echo extraction unit 12. Specifically, the tracking processing unit 13 calculates coordinates of the target and a predicted velocity vector on the basis of a velocity vector presumed from the coordinates of the target at a time of scanning in the past. The tracking processing unit 13 outputs the calculated coordinates of the target and the predicted velocity vector to the display 6.

The maximum reachable distance calculation unit 14 calculates a maximum reachable distance that is a maximum distance which the ship can travel in a preset time (hereinafter, referred to as a set time t1) on the basis of the predicted velocity vector calculated by the tracking processing unit 13. The maximum reachable distance is calculated on the basis of a speed that the ship can reach by accelerating in the set time t1 in one example. A notification of the maximum reachable distance is provided to the other ship reachable range calculation unit 17.

The target size estimation unit 15 estimates the size of the target (static information) extracted by the target echo extraction unit 12. Specifically, the target size estimation unit 15 estimates the size of the target on the basis of the two-dimensional size of the echo image of the target, the echo intensity of the target, and the like.

The maximum veering angle calculation unit 16 calculates a maximum veering angle $\phi_n$ (n=1, 2, . . . ) that is an angle that can be turned in the set time t1 on the basis of a maximum veering rate that is assumed from the size of the target estimated by the target size estimation unit 15. Note that n is a natural number and is a number applied to each corresponding target.

Figure 2:
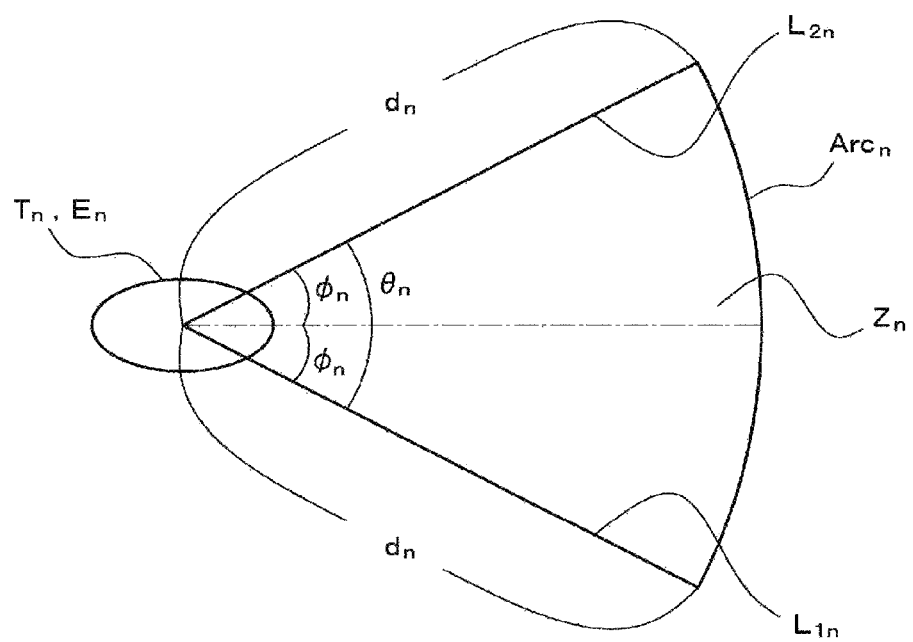
FIG. 2 is a diagram schematically illustrating a target to be tracked and a reachable range of another ship that the target can reach within a set time.

FIG. 2 is a diagram schematically illustrating an echo image $E_n$ of a target $T_n$ as a target to be tracked and a reachable range $Z_n$ that is a range that the target $T_n$ can reach in the set time t1.

The other ship reachable range calculation unit 17 calculates the reachable range of another ship $Z_n$ as illustrated in FIG. 2. The reachable range of another ship $Z_n$ is a range with a fan shape surrounded by a first line segment $L_{1n}$, a second line segment $L_{2n}$, and an arc $Arc_n$. The first line segment $L_{1n}$ is a line segment that starts from a representative point of the echo image $E_n$ of the target $T_n$ and extends by a length $d_n$ in a direction inclined in a starboard direction by the maximum veering angle $\phi_n$ relative to the bow direction (single dotted-dashed line in FIG. 2) of the target $T_n$. The second line segment $L_{2n}$ is a line segment that starts from a representative point of the echo image $E_n$ of the target $T_n$ and extends by the length $d_n$ in a direction inclined in the bow direction of the target $T_n$ by the maximum veering angle $\phi_n$ relative to a port direction. The first line segment $L_{1n}$ and the second line segment $L_{2n}$ have the same length $d_n$. The length $d_n$ is set to be a length in accordance with the maximum reachable distance. The arc $Arc_n$ is an arc around a representative point of the echo image $E_n$ of the target $T_n$ and is an arc that connects the tip end of the first line segment $L_{1n}$ and the second line segment $L_{2n}$. An angle $\theta_n$ between the first line segment $L_{1n}$ and the second line segment $L_{2n}$ is an angle range (angle range in which travel is possible) in which the target can travel in the set time t1.

Note that although the first line segment $L_{1n}$ and the second line segment $L_{2n}$ extend in the directions inclined by the angle $\phi_n$ on the starboard side and on the port side with reference to the bow direction in the embodiment, the present invention is not limited thereto. Specifically, the ship traveling direction may be calculated on the basis of the turning angular velocity of the ship, and the angle $\theta_n$ may be decided with reference to the traveling direction in one example. The turning angular velocity of the ship can be obtained by using an automatic identification system (AIS), for example.

The other ship reachable range calculation unit 17 calculates the reachable range of another ship $Z_n$ of each of all targets $T_n$ as targets to be tracked. A notification of the other ship reachable range $Z_n$ of each target $T_n$ calculated by the other ship reachable range calculation unit 17 is provided to the display 6.

The host ship reachable range calculation unit 18 calculates a reachable range of a host ship $Z_s$ that is a range that the host ship S can reach in the set time t1. The host ship reachable range calculation unit 18 calculates the reachable range of the host ship $Z_s$ on the basis of the size of the host ship (the width and the length of the host ship, for example) input by the user in advance, the speed of the host speed obtained from a ship speedometer (omitted in the drawing) of the host ship, the bow direction of the host ship, and the like. The reachable range of the host ship $Z_s$ calculated by the host ship reachable range calculation unit 18 is a range with a fan shape that is similar to that of the reachable range of another ship $Z_n$ illustrated in FIG. 2.

Figure 3:
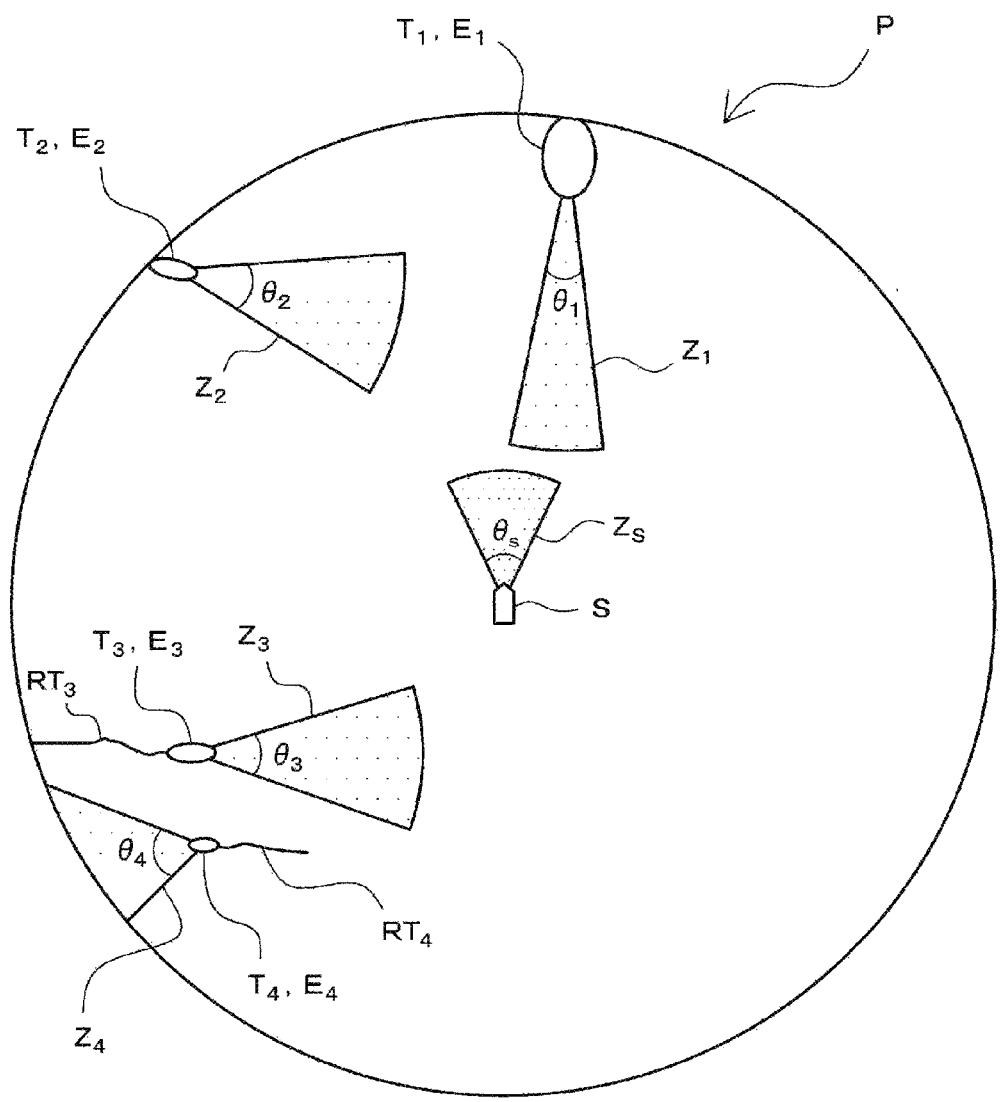
FIG. 3 is a diagram illustrating an example of a display screen displayed on a display illustrated in FIG. 1.

FIG. 3 is a diagram illustrating an example of a display screen P displayed on the display 6 illustrated in FIG. 1. The host ship S, the reachable range of the host ship $Z_s$, echo images $E_1$ to $E_4$ of targets $T_1$ to $T_4$ extracted by the target echo extraction unit 12, and reachable ranges of other ships $Z_1$ to $Z_4$ calculated to correspond to the respective targets $T_1$ to $T_4$ are displayed on the display 6. In FIG. 3, an example in which the four targets $T_1$ to $T_4$ have been detected is illustrated. In addition, wakes of the respective targets $T_1$ to $T_4$ (only the wake $RT_3$ of the target $T_3$ and the wake $RT_4$ of the target $T_4$ are illustrated in FIG. 3) are displayed on the display 6.

In addition, the reachable range of the host ship $Z_s$ is represented by dark hatching while the reachable ranges of other ships $Z_1$ to $Z_4$ are represented by light hatching in FIG. 3. However, different colors are actually applied to the reachable range of the host ship $Z_s$ and the reachable ranges of other ships $Z_1$ to $Z_4$ on the display 6. The reachable range of the host ship $Z_s$ is represented with a light blue color while the reachable ranges of other ships $Z_1$ to $Z_4$ are represented with an orange color in one example.

Incidentally, a maximum veering rate of the ship typically differs depending on the static information of the ship, specifically, the size and the like of the ship. For example, it is difficult for a ship with a large size to suddenly change direction, and the maximum veering rate is relatively low. Meanwhile, a ship with a small size has a higher maximum veering rate than a ship with a larger size. Therefore, an angle range in which a large ship can travel is relatively small while an angle range in which a small ship can travel is larger than the angle range in which a large ship can travel in general.

In this regard, the radar device 1 according to the embodiment calculates angle ranges $\theta_1$ to $\theta_4$ in which the respective targets $T_1$ to $T_4$ can travel on the basis of static information of the targets $T_1$ to $T_4$ (the sizes of the ships in the case of the embodiment) and calculates an angle range $\theta_s$ in which the host ship S can travel on the basis of the size of the host ship S. In this manner, it is possible to more accurately calculate the ranges that the host ship and other ships can reach after the prescribed time interval.

Advantages

As described above, the signal processing unit 10 in the radar device 1 according to the embodiment calculates the reachable ranges $Z_s$ and $Z_1$ to $Z_4$ of the ships on the basis of the static information of the ships (the sizes of the ships in the case of the embodiment). In this manner, it is possible to accurately calculate the reachable ranges $Z_s$ and $Z_1$ to $Z_4$ of the ships as compared with a case in which the reachable ranges are calculated on the basis of only dynamic information (the speeds and the like of the ships) of the ships, for example.

Therefore, according to the signal processing unit 10, it is possible to accurately calculate a location range that a ship can reach within a prescribed time interval.

In addition, in the signal processing unit 10, the sizes of other ships are estimated on the basis of reflected waves that are transmitted waves from the antenna 3 reflected by and returning from other ships, and the reachable ranges $Z_1$ to $Z_4$ of the ships are estimated on the basis of the sizes of other ships. In this manner, it is possible to estimate the sizes of other ships on the basis of information obtained by the radar device mounted on the ship and to thereby estimate the sizes of other ships without using a special device.

In addition, the reachable range $Z_s$ of the host ship S is calculated on the basis of the size of the host ship S input by the user according to the signal processing unit 10. In this manner, since it is only necessary for the user to input the size of the ship, the size of which is known, it is possible to more accurately calculate the reachable range $Z_s$ of the ship on the basis of more accurate information of the size of the ship.

In addition, the signal processing unit 10 calculates the reachable ranges $Z_s$ and $Z_1$ to $Z_4$ of the ships on the basis of the maximum veering angle $\phi_n$ of the ships calculated on the basis of the sizes of the ships. Since the maximum veering angle $\phi_n$ of the ships depends on the sizes of the ships, it is possible to appropriately calculate the maximum veering angle $\phi_n$ of the ships by calculating the maximum veering angle $\phi_n$ of the ship on the basis of the sizes of the ships.

In addition, the reachable ranges $Z_s$ and $Z_1$ to $Z_4$ are calculated by using the sizes of the ships as static information of the ships according to the signal processing unit 10. Since the reachable ranges $Z_s$ and $Z_1$ to $Z_4$ of the ships depend on the sizes of the ships, it is possible to accurately calculate the reachable ranges $Z_s$ and $Z_1$ to $Z_4$ by calculating the reachable ranges $Z_s$ and $Z_1$ to $Z_4$ on the basis of the sizes of the ships.

In addition, the signal processing unit 10 also calculates the reachable ranges $Z_s$ and $Z_1$ to $Z_4$ on the basis of the speed and the like of the host ship, which are dynamic information of the ship. In this manner, it is possible to more accurately calculate the reachable ranges $Z_s$ and $Z_1$ to $Z_4$.

In addition, according to the radar device 1 of the embodiment, the reachable ranges $Z_s$ and $Z_1$ to $Z_4$ of the ships are displayed on the display 6. In this manner, it is possible to provide the radar device 1 with which the user can easily recognize the reachable ranges $Z_s$ and $Z_1$ to $Z_4$.

Modification Examples

Although the embodiment of the present invention has been described above, the present invention is not limited thereto, and various modifications can be made without departing from the gist of the present invention.

Figure 4:
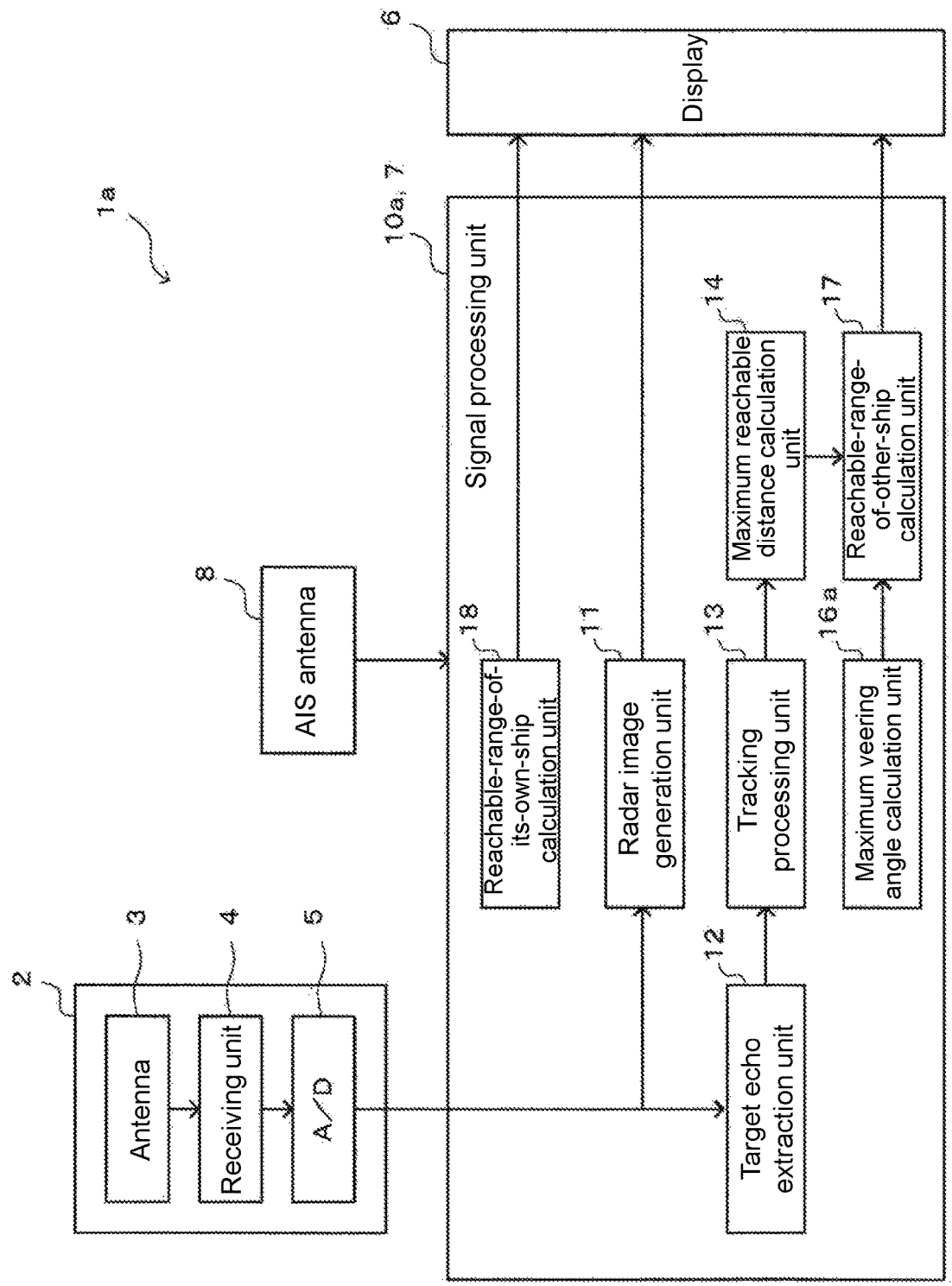
FIG. 4 is a block diagram of a radar device according to a modification example.

(1) FIG. 4 is a block diagram of a radar device 1a according to a modification example. Although the size of the target (another ship) is estimated by the target size estimation unit 15 in the aforementioned embodiment, the present invention is not limited thereto. In the modification example, the size of the target can be obtained through an AIS.

A signal processing unit 10a (signal processing device) of the radar device 1a according to the modification example has a configuration in which the target size estimation unit 15 is omitted from the radar device 1 according to the aforementioned embodiment. In addition, the radar device 1a includes an AIS antenna 8. Also, a maximum veering angle calculation unit 16a of the signal processing unit 10a according to the modification example operates in a slightly different manner from operations of the maximum veering angle calculation unit 16 according to the aforementioned embodiment.

The AIS antenna 8 is an antenna for receiving AIS information. The AIS antenna 8 receives information (for example, the size and the like of another ship) related to another ship located in the surroundings of the host ship.

The maximum veering angle calculation unit 16a is different from the maximum veering angle calculation unit 16 according to the aforementioned embodiment in the following point. Specifically, the maximum veering angle calculation unit 16a calculates the maximum veering angle $\phi_n$ of another ship on the basis of the information (specifically, the length of another ship and the width of another ship) related to the size of another ship obtained through the AIS antenna 8.

It is possible to obtain accurate information related to the size of another ship by using the AIS as described above, thereby obtaining accurate information related to the size of another ship, and thus to accurately calculate reachable ranges $Z_1$ to $Z_4$ of other ships in the modification example.

Note that although the modification example has been described on the basis of the example in which the maximum veering angle calculation unit 16a calculates the maximum veering angle $\phi_n$ of another ship on the basis of the size of another ship in the modification example, the present invention is not limited thereto. Specifically, the maximum veering angle $\phi_n$ of another ship may be calculated on the basis of the type of another ship obtained through the AIS antenna 8 in one example.

Figure 5:
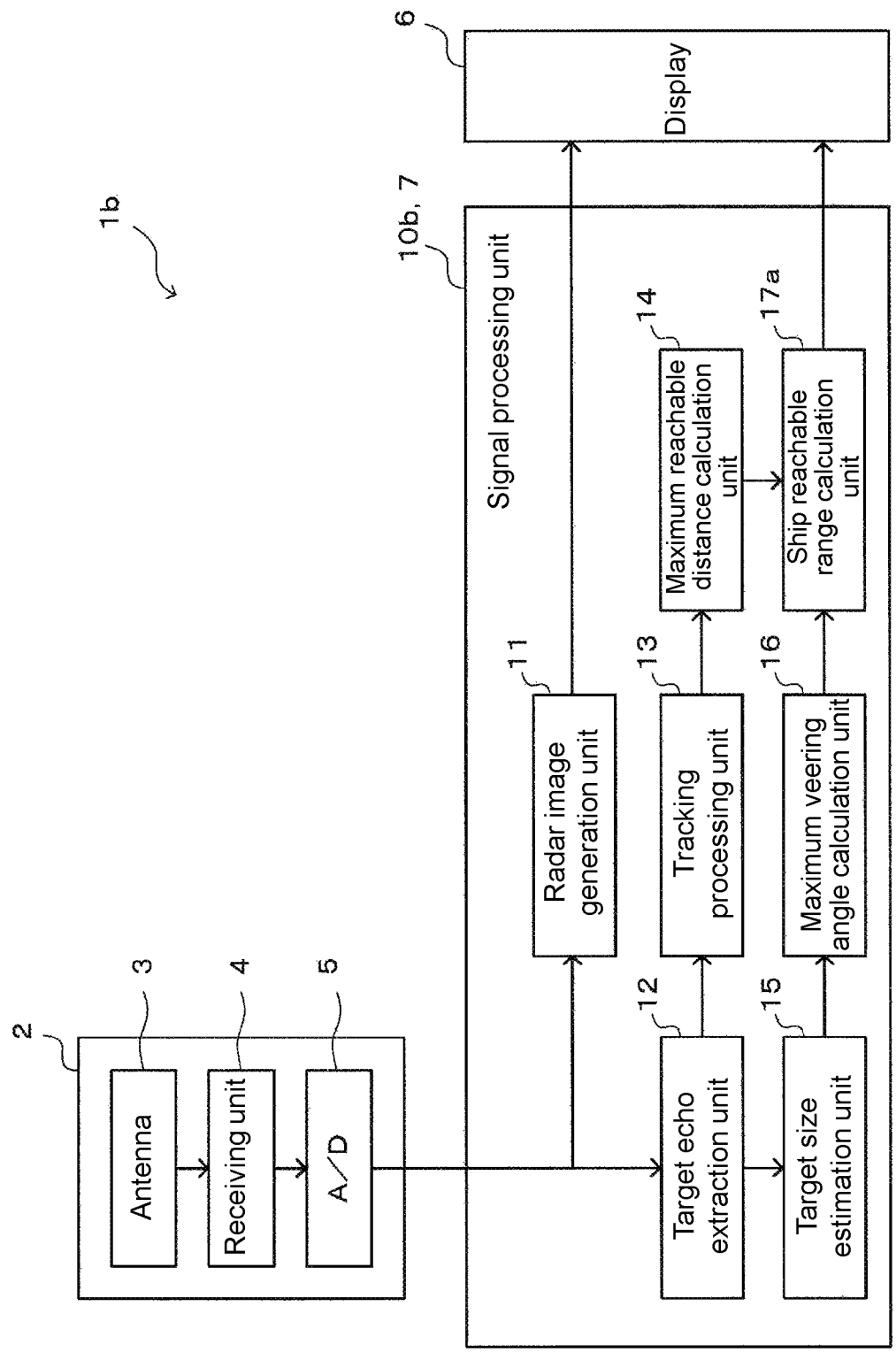
FIG. 5 is a block diagram of a radar device according to a modification example.

(2) FIG. 5 is a block diagram of a radar device 1b according to a modification example. Although the aforementioned embodiment has been described above on the basis of the example of the radar device 1 mounted on the ship, the present invention is not limited thereto. Specifically, the radar device 1b according to the modification example is placed on the shore such as in a maritime area.

A signal processing unit 10b (signal processing device) of the radar device 1b according to the modification example has a configuration in which the host ship reachable range calculation unit 18 is omitted from the signal processing unit 10 according to the aforementioned embodiment. In addition, the signal processing unit 10b according to the modification example has a configuration in which a ship reachable range calculation unit 17a is provided instead of the other ship reachable range calculation unit 17 according to the aforementioned embodiment.

The radar device 1b calculates the reachable range $Z_n$ of each ship that travels in a marine area near the maritime area in which the radar device 1b is placed in accordance with the size of each ship. That is, the radar device 1b is provided as a monitoring radar that monitors ships that travel near the maritime area. Note that since a configuration and operations of the ship reachable range calculation unit 17a are the same as those of the other ship reachable range calculation unit 17 other than that a target of calculation of the reachable range $Z_n$ is ships that travel in a marine area near the maritime area in which the radar device 1b is placed, the description thereof will be omitted.

According to the signal processing unit 10b of the radar device 1b in the modification example, it is possible to accurately calculate the reachable range similarly to the case of the aforementioned embodiment as described above. Further, according to the signal processing unit 10b, it is possible to provide a signal processing unit that has an appropriate configuration as a signal processing unit in a monitoring radar installed on the shore.

Figure 6:
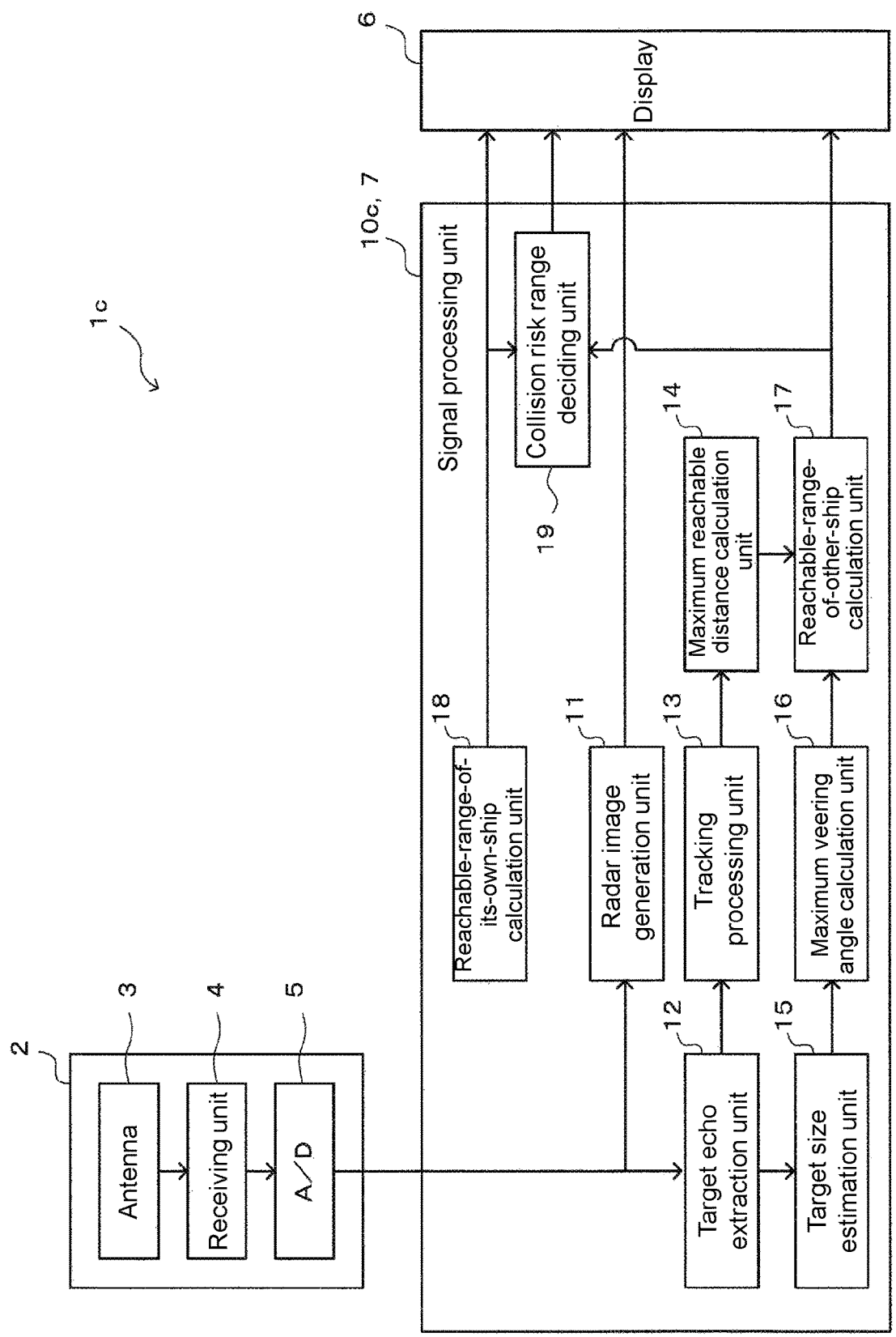
FIG. 6 is a block diagram of a radar device according to a modification example.

(3) FIG. 6 is a block diagram of a radar device 1c according to a modification example. A signal processing unit 10c (signal processing device) of the radar device 1c according to the modification example has a collision risk range deciding unit 19 in addition to the respective components that the signal processing unit 10 of the radar device 1 according to the aforementioned embodiment has.

The collision risk range deciding unit 19 decides a collision risk range $Z_d$ that is an area with a high probability that the host ship will collide with another ship, on the basis of the reachable range of the host ship $Z_s$ calculated by the host ship reachable range calculation unit 18 and the reachable range of another ship $Z_n$ calculated by the other ship reachable range calculation unit 17. Specifically, the collision risk range deciding unit 19 decides a range in which the reachable range of the host ship $Z_s$ and the reachable range of another ship $Z_n$ overlap each other as the collision risk range $Z_d$. A notification of the collision risk range $Z_d$ decided by the collision risk range deciding unit 19 is provided to the display 6.

Figure 7:
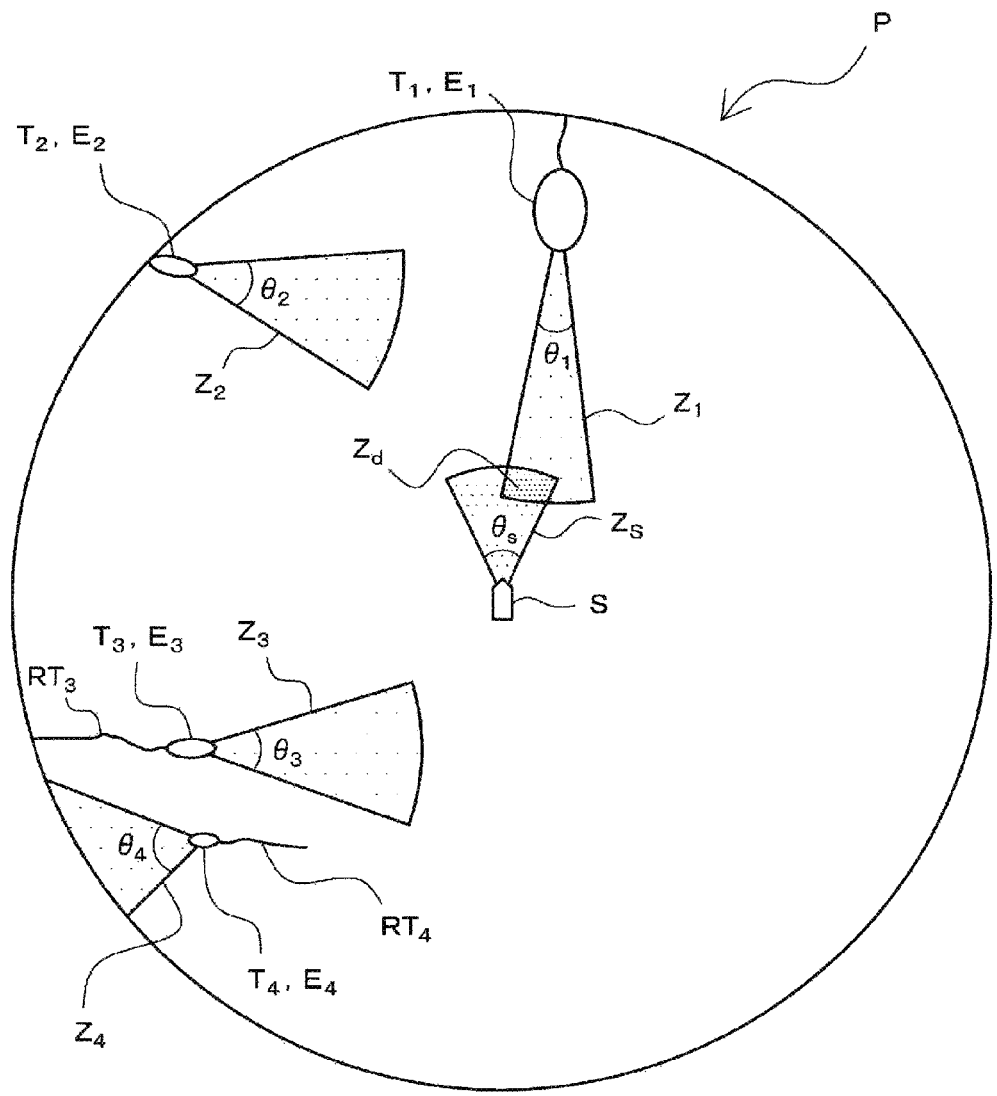
FIG. 7 is a diagram illustrating an example of a display screen displayed on a display illustrated in FIG. 6.

FIG. 7 is a diagram illustrating an example of a display screen P displayed on the display 6 illustrated in FIG. 6. The host ship S, the reachable range of the host ship $Z_s$, echo images $E_1$ to $E_4$ of other ships (that is, targets $T_1$ to $T_4$), and reachable ranges of other ships $Z_1$ to $Z_4$ calculated to correspond to the respective targets $T_1$ to $T_4$ are displayed on the display 6 similarly to the display 6 in the radar device 1 according to the aforementioned embodiment.

In addition, the collision risk range $Z_d$ is displayed with a color (for example, red) that is different from those of the reachable range of the host ship $Z_s$ and the reachable ranges of other ships $Z_1$ to $Z_4$ in the modification example. In this manner, it is possible to appropriately display an area with a high risk that the host ship collides against another ship as the collision risk range $Z_d$. Note that the color of the collision risk range $Z_d$ that is different from the colors of the reachable range of the host ship $Z_s$ and the reachable range of other ships $Z_1$ to $Z_4$ is represented by applying, to the collision risk range $Z_d$, dotted hatching with a different density from that of the reachable ranges $Z_s$ and $Z_1$ to $Z_4$ in FIG. 7.

As described above, the part at which the reachable ranges of the two ships overlap each other is decided as the collision risk range $Z_d$ by the signal processing unit 10c in the radar device 1c according to the modification example. In this manner, it is possible to appropriately decide a range with a high probability that the two ships collide against each other.

(4) Although the aforementioned embodiment has been described on the basis of the example in which the reachable range of the host ship $Z_s$ and the reachable range of another ship $Z_n$ are constantly displayed irrespective of a location relationship with another ship or the shore, the present invention is not limited thereto. Specifically, the reachable range of the ship may not be displayed in a case in which another ship or the shore is not present within a predetermined range on the side of the traveling direction of the ship in one example.

In a case in which another ship or the shore is not determined within the predetermined range on the side of the traveling direction of the ship, the necessity of displaying the reachable range of the ship on the display 6 is low since the probability that the ship collides against another ship or the shore is low. Therefore, it is possible to prevent the display screen displayed on the display 6 from becoming complicated by not displaying such a reachable range.

(5) Although the maximum veering angle of the ship is calculated on the basis of only either the size or the type of the ship in the aforementioned embodiment, the present invention is not limited thereto, and the maximum veering angle of the ship may be calculated on the basis of both the size and the type of the ship.

What is claimed is:

1. A radar device comprising:
an antenna configured to transmit electric waves to a ship, receive reflected electric waves reflected from the transmitted electric waves by the ship, and output the reflected electric waves to a processing circuitry; and
the processing circuitry, coupled to the antenna, configured to:
receive the reflected electric waves output from the antenna,
estimate static information of the ship on a basis of the received reflected electric waves,
calculate a reachable range, which is a location range the ship is capable of reaching within a prescribed time interval, on a basis of the static information of the ship,
calculate a maximum veering angle of the ship on the basis of the static information of the ship, and
calculate the reachable range on a basis of the maximum veering angle.

2. The radar device according to claim 1, wherein the processing circuitry is further configured to:
estimate the static information of the ship on a basis of reflected waves which are transmitted waves reflected by and returned from the ship.

3. The radar device according to claim 2, wherein the processing circuitry estimates a size of the ship as the static information of the ship on the basis of the reflected waves reflected by and returning from the ship.

4. The radar device according to claim 1, wherein the static information of the ship is information obtained through an automatic identification system (AIS) antenna.

5. The radar device according to claim 1, wherein the static information of the ship is information input by a user.

6. The radar device according to claim 1, wherein the static information of the ship is information related to at least either a size of the ship or a type of the ship.

7. The radar device according to claim 1, wherein the processing circuitry calculates the reachable range on a basis of dynamic information of the ship.

8. The radar device according to claim 1,
wherein the processing circuitry calculates reachable ranges of a plurality of ships, and
decides a part in which respective reachable ranges of at least two ships overlap each other as a collision risk range.

9. A radar device comprising:
the processing circuitry according to claim 1; and
a display on which the reachable range calculated by the processing circuitry is displayed.

* * * * *